(12) United States Patent
O'Brien, Jr et al.

(10) Patent No.: US 8,390,136 B2
(45) Date of Patent: Mar. 5, 2013

(54) METHOD AND APPARATUS FOR GENERATING ENERGY

(76) Inventors: Robert Leonard O'Brien, Jr, Canton, CT (US); John Gerard Chupa, Farmington Hills, MI (US)

(*) Notice: Subject to any disclaimer, the term of this patent is extended or adjusted under 35 U.S.C. 154(b) by 274 days.

(21) Appl. No.: 12/802,522

(22) Filed: Jun. 8, 2010

(65) Prior Publication Data

US 2011/0298223 A1 Dec. 8, 2011

(51) Int. Cl.
*F02B 63/04* (2006.01)
*F03G 7/08* (2006.01)
*H02K 7/18* (2006.01)

(52) U.S. Cl. ........................................ 290/1 R
(58) Field of Classification Search ............... 290/1 R
See application file for complete search history.

(56) References Cited

U.S. PATENT DOCUMENTS

| | | | | |
|---|---|---|---|---|
| 2,436,683 A | 2/1948 | Wood | | 290/52 |
| 2,579,932 A * | 12/1951 | Kobernick | | 237/12.1 |
| 3,589,313 A | 6/1971 | Smith et al. | | 110/222 |
| 3,670,669 A | 6/1972 | Hoad | | 110/220 |
| 3,741,890 A | 6/1973 | Smith et al. | | 210/667 |
| 3,750,001 A | 7/1973 | McCloskey | | 322/35 |
| 3,827,946 A | 8/1974 | Grimett et al. | | 203/11 |
| 4,010,098 A | 3/1977 | Fassell | | 210/609 |
| 4,024,229 A * | 5/1977 | Smith et al. | | 423/562 |
| 4,157,961 A | 6/1979 | Borst | | 210/768 |
| 4,290,269 A | 9/1981 | Hedstrom et al. | | 60/670 |
| 4,291,636 A | 9/1981 | Bergsten et al. | | 110/346 |
| 4,316,774 A | 2/1982 | Trusch | | 203/11 |
| 4,321,151 A * | 3/1982 | McMullen | | 210/769 |
| 4,346,302 A * | 8/1982 | Bozzuto | | 290/1 R |
| 4,454,427 A * | 6/1984 | Sosnowski et al. | | 290/2 |
| 4,624,417 A | 11/1986 | Gangi | | 241/17 |
| 4,657,681 A | 4/1987 | Hughes et al. | | 44/589 |
| 4,733,528 A * | 3/1988 | Pinto | | 60/39.12 |
| 4,750,454 A | 6/1988 | Santina et al. | | 123/3 |
| 4,762,527 A | 8/1988 | Beshore et al. | | 44/280 |
| 4,769,149 A * | 9/1988 | Nobilet et al. | | 210/603 |
| 4,784,770 A | 11/1988 | Nagao | | 210/603 |
| 4,818,405 A | 4/1989 | Vroom et al. | | 210/603 |
| 4,880,533 A | 11/1989 | Hondulas | | 210/104 |
| 4,991,408 A * | 2/1991 | Liszka | | 62/401 |
| 5,024,770 A | 6/1991 | Boyd et al. | | 210/747.7 |
| 5,032,289 A | 7/1991 | Martineau | | 210/747.6 |
| 5,279,637 A | 1/1994 | Lynam et al. | | 71/12 |
| 5,428,906 A | 7/1995 | Lynam et al. | | 34/379 |
| 5,445,088 A | 8/1995 | Daugherty et al. | | 110/346 |
| 5,451,137 A | 9/1995 | Gorlov | | 415/7 |
| 5,500,306 A | 3/1996 | Hsu et al. | | 429/401 |
| 5,534,659 A * | 7/1996 | Springer et al. | | 588/311 |
| 5,553,659 A | 9/1996 | Hegel et al. | | 164/153 |
| 5,556,232 A | 9/1996 | Malmgram | | 405/129.2 |
| 5,642,984 A | 7/1997 | Gorlov | | 416/176 |

(Continued)

OTHER PUBLICATIONS

Cogenderation of the RObert O. Pickard Envirnmental Centre Jun. 10, 2008.

(Continued)

*Primary Examiner* — Pedro J Cuevas
(74) *Attorney, Agent, or Firm* — John G. Chupa

(57) ABSTRACT

A novel furnace and scrubber assembly which generates electrical energy by the initial combustion of material and a methodology which causes such electrical energy to be generated. Further, a novel scrubber technology which improves both scrubber efficiency and furnace efficiency while recovering energy from a furnace exhaust stream.

2 Claims, 2 Drawing Sheets

U.S. PATENT DOCUMENTS

| | | | | |
|---|---|---|---|---|
| 6,036,443 | A | 3/2000 | Gorlov | 416/176 |
| 6,155,892 | A | 12/2000 | Gorlov | 440/9 |
| 6,216,463 | B1 | 4/2001 | Stewart | 60/641.2 |
| 6,223,535 | B1 * | 5/2001 | Kitz | 60/641.2 |
| 6,253,700 | B1 | 7/2001 | Gorlov | 114/274 |
| 6,286,314 | B1 * | 9/2001 | Kitz | 60/641.2 |
| 6,293,835 | B2 | 9/2001 | Gorlov | 440/8 |
| 6,299,774 | B1 | 10/2001 | Ainsworth et al. | 210/603 |
| 6,332,320 | B2 * | 12/2001 | Kitz | 60/641.2 |
| 6,387,281 | B2 | 5/2002 | Millard et al. | 210/764 |
| 6,539,717 | B2 * | 4/2003 | Kitz | 60/641.2 |
| 6,686,556 | B2 * | 2/2004 | Mitchell | 219/121.48 |
| 6,798,080 | B1 | 9/2004 | Baarman et al. | 290/43 |
| 6,976,362 | B2 * | 12/2005 | Sheppard et al. | 60/780 |
| 7,105,088 | B2 * | 9/2006 | Schien et al. | 210/188 |
| 7,597,812 | B2 * | 10/2009 | Schien et al. | 210/770 |
| 7,644,587 | B2 * | 1/2010 | Yakobson et al. | 60/780 |
| 7,915,749 | B1 * | 3/2011 | Chupa et al. | 290/43 |
| 7,959,411 | B2 | 6/2011 | Schlabach et al. | 416/227 A |
| 8,154,138 | B2 * | 4/2012 | Ganesan et al. | 290/43 |
| 8,277,543 | B2 * | 10/2012 | Zauderer | 95/236 |
| 8,344,528 | B2 * | 1/2013 | Bassett | 290/1 R |
| 2001/0007193 | A1 * | 7/2001 | Kitz | 60/641.2 |
| 2001/0010156 | A1 * | 8/2001 | Kitz | 60/641.2 |
| 2002/0144981 | A1 * | 10/2002 | Mitchell | 219/121.44 |
| 2006/0054318 | A1 * | 3/2006 | Sarada | 166/266 |
| 2008/0017369 | A1 * | 1/2008 | Sarada | 166/244.1 |
| 2008/0223046 | A1 * | 9/2008 | Yakobson et al. | 60/772 |
| 2010/0307392 | A1 * | 12/2010 | Berthold | 110/346 |
| 2010/0327590 | A1 | 12/2010 | Lee et al. | 290/52 |
| 2011/0221207 | A1 * | 9/2011 | Ganesan et al. | 290/1 R |
| 2012/0060418 | A1 * | 3/2012 | Epstein et al. | 48/127.7 |
| 2012/0137877 | A1 * | 6/2012 | Zauderer | 95/42 |
| 2012/0175888 | A1 * | 7/2012 | Chupa | 290/1 R |
| 2012/0190102 | A1 * | 7/2012 | Gitschel et al. | 435/267 |
| 2012/0200092 | A1 * | 8/2012 | Johnson et al. | 290/1 R |

OTHER PUBLICATIONS

Sanitary Sewar—published by Wikipedia doenloaded on Jun. 21, 2010.

* cited by examiner

METHOD AND APPARATUS FOR GENERATING ENERGY

GENERAL BACKGROUND

1. Field of the Invention

The present invention generally relates to a method and apparatus for generating energy and more particularly, to a method and apparatus which may be used in combination with a scrubber and a furnace and which is effective to increase the efficiency of operation of the furnace while reclaiming otherwise wasted energy, and to a new and novel scrubber and furnace.

2. Background of the Invention

Furnaces are used in a wide variety of applications in which material is to be burned or incinerated. Further, oftentimes a scrubber is used in combination with many such furnaces, and functions to clean or remove various types of particulates which emanate from the gaseous type output of the furnace (these particulates are formed in the burning process), and then to allow the substantially "cleaned" output of the furnace to emanate into the environment.

While such furnaces do indeed desirably incinerate a wide variety of materials, and while such scrubbers do indeed clean the material emanating from such furnaces, the furnaces and the scrubbers often require much energy with which to operate and are relatively inefficient. Typically such energy, which is consumed by the various furnaces and scrubbers, is created by the burning of coal which further undesirably impacts our environment.

There is therefore a need for a method for increasing the energy efficiency of such furnaces and scrubbers and the present inventions provide such a methodology. There is therefore a further need for a new and improved furnace and/or scrubber assembly and the present inventions do indeed provide such a new and improved furnace and scrubber assembly. The present inventions also provided many other benefits which will be more fully set forth and apparent from the discussion set forth below.

SUMMARY OF THE INVENTION

It is a first non-limiting object of the present inventions to provide a methodology which overcomes the various drawbacks of current and prior furnace and scrubber operating methodologies.

It is a second non-limiting object of the present invention to provide a new and improved furnace assembly which overcomes some or all of the various drawbacks which have been delineated above.

It is a third non-limiting object of the present invention to provide a new and improved scrubber assembly which overcomes some or all of the various drawbacks which have been delineated above.

According to a first non-limiting aspect of the present invention, a methodology is provided for the generation of electrical energy and includes the steps of providing a turbine assembly; and directing the output of a furnace to the turbine assembly, effective to cause the directed output to impact the provided turbine assembly, thereby causing the provided turbine assembly to generate electrical energy.

According to a second non-limiting aspect of the present invention, a furnace assembly is provided and includes a first portion which receives material, which burns the first material, and which produces output gas due to the burning of the first material; and a turbine assembly which is coupled to the furnace and which extracts heat from the first material and thereby generates electrical energy from the first material.

According to a third non-limiting aspect of the present invention, a first turbine assembly is provided which extracts heat from a gaseous output; a scrubber assembly is provided and includes a scrubber which receives a gaseous output, which cleans the received gas, and which produces output material; and a second turbine assembly which receives the output material and which generates electrical energy from the received output material.

These and other features, aspects, and advantages of the present invention will become apparent from a reading of the detailed description of the preferred embodiment of the invention (including the subjoined claims) and by reference to the following drawings.

DETAILED DESCRIPTION OF THE PREFERRED EMBODIMENT OF THE INVENTION

Figure 1:
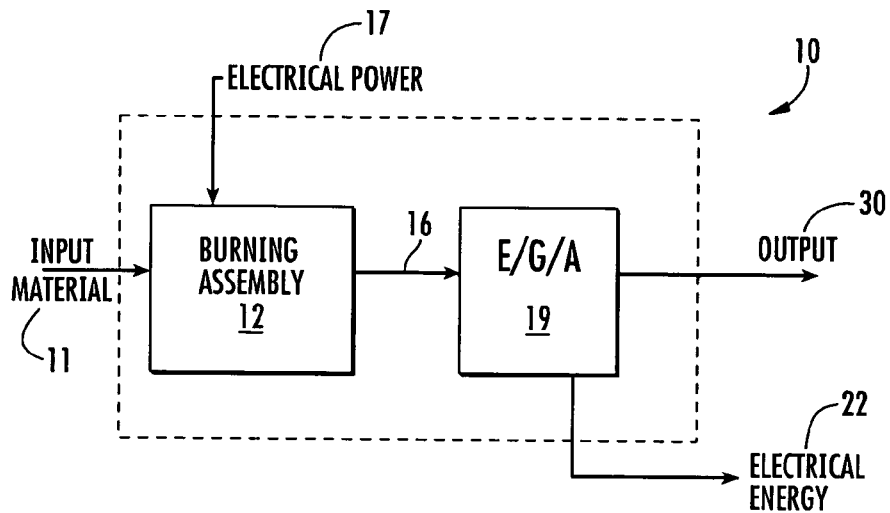
FIG. 1 is a block diagram of furnace assembly which is made in accordance with the teachings of the first alternative embodiment of the invention.

Referring now to FIG. 1, there is shown a furnace assembly 10 which is made in accordance with the teachings of the preferred embodiment of the invention and which is adapted to receive material 11 to be burned.

Particularly, furnace assembly 10 includes a burner assembly 12 which receives material 11 and which is adapted to burn the material and emit a gaseous output stream 16. The burner assembly also receives electrical power 17 to operate. The stream 16 may or may not include particulate type material. The furnace assembly 10 further includes an energy generation assembly 19 which is coupled to and receives the stream 16 and which generates electrical energy 22 by use of the received stream 16. One non-limiting example of energy generation assembly 19 is an Organic Rankine Cycle Engine, although other types of assemblies may be utilized. The stream 16 may pass through the assembly 19, after causing the assembly 19 to generate electrical energy 22, and form an output 30. Electrical power 22 may be used to operate burning assembly 12. The traveling stream 16 may cause the assembly 19 to generate electrical energy by impinging upon and moving the blades or other elements of a turbine which forms assembly 19.

Figure 2:
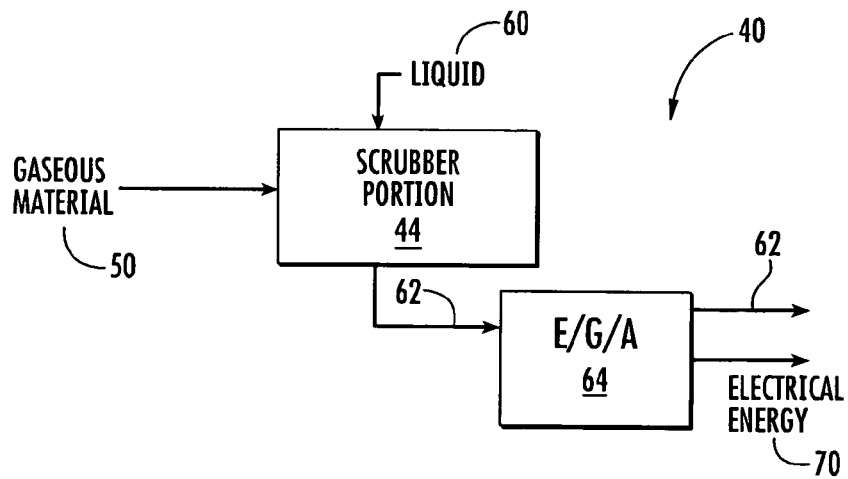
FIG. 2 is a block diagram of a scrubber assembly which is made in accordance with the teachings of the second alternative embodiment of the invention.

In a second non-limiting embodiment of the invention, as best shown in FIG. 2, a scrubber assembly 40 may be created. Particularly, the scrubber assembly 40 includes a scrubber portion 44 which receives gaseous material 50 which include particulates to be removed or cleaned from the overall material 50 before the material 50 is allowed to be emitted into the environment. The scrubber portion 44 performs these functions by the use of a liquid 60 (such as water), in a known and conventional manner. However, according to the teachings of the invention, the output 62 from the scrubber portion 44 is communicated to an energy generation assembly 64 (such as, by way of example and without limitation, an impulse or reaction based turbine) and the communicated output stream 62 (which may comprise gas, liquid, or a mixture of each) causes the energy generation assembly 64 to produce electrical energy 70. This occurs, for example, by having output 62 impinge upon and cause movement of the blades of the turbine of assembly 64. The output stream 62 is then output from the assembly 64 after such energy 70 is generated. The power 70 may be used to operate the portion 44.

Figure 3:
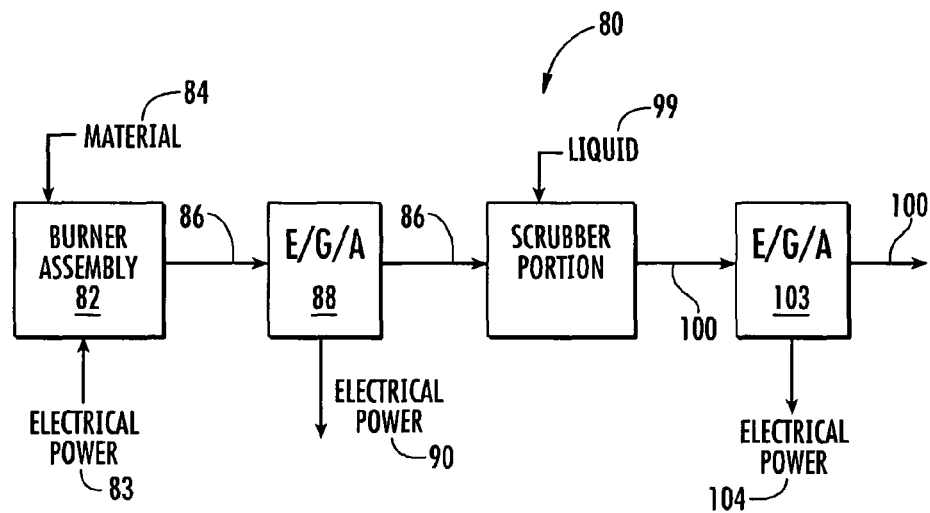
FIG. 3 is a block diagram of a furnace assembly which is made in accordance with the teachings of a first preferred embodiment of the invention.

According to a third non-limiting embodiment of the invention (FIG. 3), a furnace assembly 80 may be created and which includes a burner assembly 82 which receives material 84 which is to be incinerated, and which requires electrical power 83 to operate. The burner assembly 82 burns the material 84 and generates a gaseous stream of material 86, which contains particulates. The furnace assembly 80 further includes an electrical energy generating portion 88 which receives the particulate containing output stream 86. The assembly 88 generates electrical energy 90 by use of the received stream 86 (e.g., the stream 86 impinges upon and moves the turbine blades of assembly 88), and allows the received stream 86, once such energy 90 has been generated, to be output. The furnace assembly 80 further includes a scrubber portion 92 which receives the particulate containing output material 86 which has passed through the assembly 88. The portion 92 further receives a liquid input 99 and uses the liquid input 99 to remove some or all of the particulates from the received stream 86, thereby outputting a substantially clean stream of material 100. The furnace assembly 80 further includes a second energy generating assembly 103, such as a turbine assembly, which receives the stream 100 and which generates electrical energy 104 by use of the received stream 100. Once the stream 100 causes the generator 103 to generate electrical energy, the stream 100 is output from the generator as a final output stream 100. Energy 90, 104 may be used to power any type of assembly or for any other purpose, such as, way of example and without limitation to operate a plant, such as a wastewater treatment plant, or to operate burner assembly 82.

Figure 4:
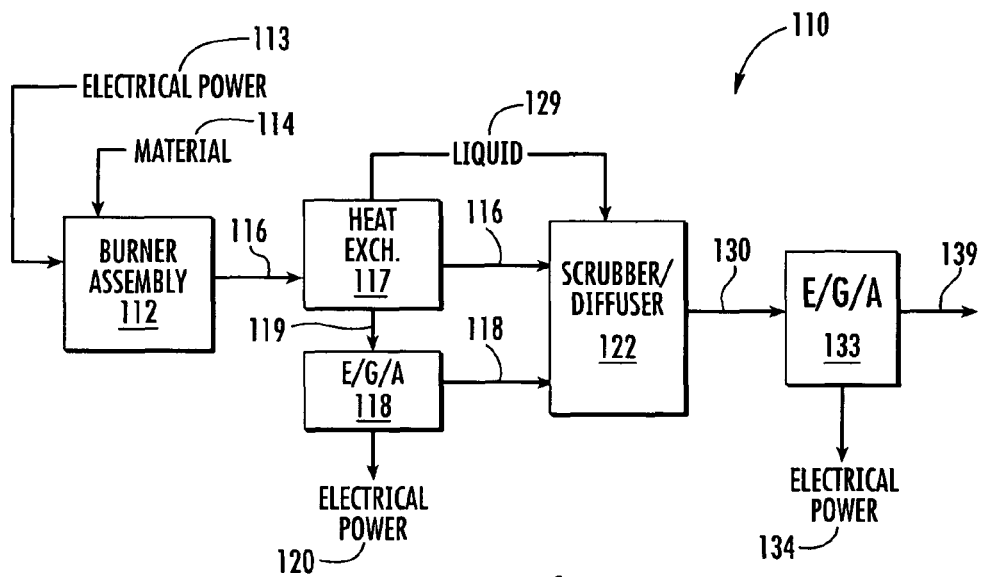
FIG. 4 is a block diagram of a furnace assembly which is made in accordance with the teachings of a second preferred embodiment of the invention.

According to a fourth non-limiting embodiment of the invention, as shown in FIG. 4, a furnace assembly 110 may be created and which includes a burner assembly 112 which receives material 114 which is to be incinerated, and which requires electrical power 113 to operate. The burner assembly 112 burns the material 114 and generates a gaseous stream of material 116, which contains particulates. The furnace assembly 110 further includes a heat exchanger 117 and an electrical energy generating portion 118. The portion 117 receives the particulate containing output stream 116 and a portion of liquid 129. The assembly 117 generates vapor 119 by use of the received stream 116 and liquid 129, and the produced vapor 119 impinges upon and moves the blades of the turbine 118. The received stream 116, once such energy 120 has been generated, is output from heat exchanger 117. The vapor 119, after passing through the turbine portion 118 also is coupled to scrubber/diffuser 122. The furnace assembly 110 further includes a scrubber portion 122 which receives the particulate containing output material 116 (from the heat exchanges 117) and the vapor 119 after the vapor 119 passes through generator 118. The portion 122 further receives a liquid input 129 and uses the liquid input 129 to remove some or all of the particulates from the received stream 116, thereby outputting a substantially clean stream of material 130. The furnace assembly 110 further includes a second energy generating assembly 133, such as a turbine assembly, which receives the stream 130 and which generates electrical energy 134 by use of the received stream 130 (e.g., the stream 130 impinges upon and moves the blades of assembly 133). Once the stream 130 causes the generator 133 to generate electrical energy, the stream 130 is output from the generator as a stream 139. Energy 120, 134 may be used to a type of assembly or for any other purpose, such as, by way of example and without limitation; to operate a plant, such as a wastewater treatment plant.

The invention provides many benefits, by way of example and without limitation, by use of a diffuser rather than a conventional venturi for the scrubber process, the back pressure on the furnace or burner assembly 12 is reduced; thereby, the power consumption of the furnace blower is reduced and proportionately, the efficiency of the system is improved. Further; the increased velocity through the scrubber portion will improve scrubber performance from ~96% to virtually 100% which will yield reduced downtime and maintenance for downstream equipment.

It is to be understood that the various inventions are not limited to the exact construction or methodology which has been illustrated above, but that various changes and modifications may be made without departing from the spirit and the scope of the various inventions as they are delineated in the following claims.

What is claimed is:

1. A method for producing electrical energy comprising the steps of receiving material; providing a furnace having a certain back pressure; providing operational energy to said furnace; burning said received material within said furnace, thereby producing a gaseous stream of material; providing a scrubber; providing a diffuser; communicating said gaseous stream of material to said scrubber through said diffuser, thereby reducing the back pressure of said furnace, effective to reduce the amount of operating energy which is utilized by said furnace while concurrently providing a clean stream of material; providing an energy generation assembly; and communicating said clean stream of material to said energy generation assembly, effective to cause said energy generation assembly to generate electrical energy.

2. A method for generating electrical energy comprising the steps receiving material; burning the material thereby producing a gaseous stream of material; providing a heat exchanger; communicating said gaseous stream of material to said heat exchanger, wherein said heat exchanger produces vapor and outputs said received gaseous stream of material; generating electrical energy by use of said vapor; providing a scrubber; providing a diffuser; communicating said gaseous stream of material to said scrubber from said heat exchanger wherein said gaseous stream of material is communicated to said scrubber only through said diffuser; communicating said vapor to said heat exchanger after said vapor been used to generate electrical energy; communicating liquid to said scrubber wherein said scrubber uses said liquid to clean said received vapor and said received gaseous stream, thereby producing a clean stream of material while concomitantly reducing the back pressure of said furnace; and generating electrical energy by use of said clean stream of material.

* * * * *